United States Patent [19]

Joslyn

[11] 4,031,044

[45] June 21, 1977

[54] POLYETHER BASED, HIGH RESILIENT POLYURETHANE FOAM

[75] Inventor: Wallace G. Joslyn, Midland, Mich.

[73] Assignee: Dow Corning Corporation, Midland, Mich.

[22] Filed: Nov. 11, 1976

[21] Appl. No.: 740,992

Related U.S. Application Data

[63] Continuation-in-part of Ser. No. 461,186, April 15, 1974, abandoned.

[52] U.S. Cl. .................... 260/2.5 AH; 260/2.5 AM
[51] Int. Cl.$^2$ ........................................ C08G 18/14
[58] Field of Search ............... 260/2.5 AH, 2.5 AM

[56] References Cited

UNITED STATES PATENTS

| | | | |
|---|---|---|---|
| 3,629,308 | 12/1971 | Bailey | 260/2.5 AH |
| 3,741,917 | 6/1973 | Morehouse | 260/2.5 AH |

*Primary Examiner*—C. Warren Ivy
*Attorney, Agent, or Firm*—Robert L. McKellar

[57] ABSTRACT

A method is disclosed in which polyether based high resilient polyurethane foams are produced. The foams have low shrinkage and are free of voids. These two main physical properties are obtained without the sacrifice of other important physical properties. The results are achieved by utilizing novel siloxane-oxyalkylene copolymeric foam stabilizers.

7 Claims, No Drawings

POLYETHER BASED, HIGH RESILIENT POLYURETHANE FOAM

This is a continuation-in-part of application Ser. No. 461,186, filed Apr. 15, 1974, now abandoned.

The expansion of technology in the polyether based polyurethane foam system over the last 10-15 years has been tremendous. It is natural, therefore, that the advent of a specialized area within that industry would materialize and take a significant portion of the commercial market. Such a specialized area is that of high resilience foams.

Resilience is defined as the work which a body can do in springing back after a deforming force has been removed. In defining resilience in polyurethane foams, the industry generally considers a sag factor to differentiate conventional foams from high resilient foams. The sag factor is the ratio of indent load deflection at 65% deflection to that of the indent load deflection at 25% deflection. Indent load deflection is measured in lbs./50 in$^2$. Conventional foams have a sag factor of 2.0 to 2.3 while high resilient foams have such a factor of 2.8 to 3.1.

Since its introduction several years ago, high resilience foams have commanded a great amount of attention from the urethane foam industry. The material has found widespread application, most significantly in the automobile industry for molded parts, but also in the furniture and bedding industries. This high acceptance has been due to the fact that most techniques from the already established polyurethane foam industry can be utilized in high resilience foams and, moreover, the properties of the foam itself differ from ordinarily produced polyurethane foam to the extent that for some applications, the high resilience foam is preferred. The physical properties most valuable are physical properties giving comfort, fatigue resistance and flame resistance.

With some modifications, the high resilience foam technology can be fitted into the already existing polyurethane foam technology.

As the foregoing indicates, the technology of the ordinary polyurethane foam industry is applicable to high resilient foams, but one area of the technology is not readily transferred. The area is that portion of the foamable composition which stabilizes the composition as it reacts, foams and finally solidifies. As a matter of fact, the foam stabilizers used in existing polyurethane foam systems cannot be used in the new high resilient foams because they cause severe voids and splits in the foam and also cause severe shrinkage of the foam slab.

It has now been found that certain specially defined polymeric materials will stabilize high resilience foams without causing voids, splits and foam shrinkage while maintaining the other valuable physical properties.

It is therefore an object of this invention to provide compositions and a process for producing high resilient polyurethane foam which will consistently give foams which have a fine uniform cell structure.

It is a further object of the invention to provide compositions and a process for producing high resilient polyurethane foam which will consistently give foams which are free of voids and splits.

Still another object of this invention is to provide compositions and a process for producing foam which will consistently maintain the foamed, cured heighth without shrinking upon cure. Yet another object of this invention is to provide the industry with more processing latitude than has been possible heretofore.

It has now been found that the use of certain siloxane-oxyalkylene copolymers as foam stabilizers in polyether based high resilient polyurethane foams will allow the production of foams which will have no voids or splits, no slab shrinkage and useful physical properties. In addition, the foam stabilizers of this invention give the producer more process latitude in that he cannot only utilize the foam stabilizer in various quantities to fit his own peculiar polyurethane foam needs, but he can utilize the foam stabilizers in both of the current, popular polyurethane foam processing systems i.e. the polymer in polyol and the cross-linked systems.

More specifically, the invention deals with a process for preparing high resilient polyurethane foam, which process includes the steps:

[I] Preparing a homogeneous mixture consisting essentially of

A. 100 parts by weight of a base polyether polyol selected from a group consisting of i. a polyether triol containing at least 40 mole percent primary hydroxyl groups and having a molecular weight in the range of 2,000 to 8,000 grams per mole and ii. a mixture of (i) and an additional polyether polyol having an average of at least two hydroxyl groups, wherein said polyether polyol is present in the mixture (ii) to at least 40 weight percent of the total polyether polyol content of (ii), B. a sufficient amount of organic polyisocyanate to give from 90–120 percent, on a stoichiometric basis, of isocyanate radicals for each hydroxyl radical in the composition, C. a catalytic amount of a catalyst for the production of the high resilient polyurethane foam, D. 1–10 parts by weight of a blowing agent, E. a foam stabilizing amount of a siloxaneoxyalkylene copolymer selected from a group consisting of (1), (2), (3), (4) or mixtures thereof wherein (1) has the general formula

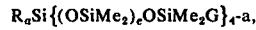

in which formula R is a hydrocarbon radical free of aliphatic unsaturation and contains from 1–10 carbon atoms, $a$ is 0–3, Me is a Methyl radical, G is a radical selected from a group consisting of —D(OR'')$_m$A and —L—D(OR'')$_m$A wherein L is an oxygen or sulfur atom, D is a divalent linking radical selected from the group consisting of i. alkylene radicals, ii. radicals composed of carbon, hydrogen and oxygen atoms, the oxygen atoms being present as ether, ester or hydroxy groups, and iii. radicals composed of carbon, hydrogen and sulfur atoms, the sulfur atoms being present as thioether, thioester or thiol groups, there being no more than 8 carbon atoms in D, and L is bonded to a carbon atom of the D radical, R'' is composed of propylene radicals and radicals selected from the group consisting of ethylene and butylene radicals wherein the amount of ethylene and butylene radicals is less than 35 weight percent of the total (OR") radical, m has an average value of 1-15, A is a radical selected from the group consisting of the —OR', OOCR', and

radicals wherein R' is a radical free of aliphatic unsaturation selected from the group consisting of hydrocarbon and hydrocarboxy radicals, the A radical containing a total of less than eleven atoms, in which formula when $a = 0$, then $e$ is 0, 1 or 2; when $a = 1$, then $e$ is 0, 1, 2 or 3; when $a = 2$, then $e$ is 0–5, and when $a = 3$, then $e$ is 0–7;

(2) has the general formula

GMe$_2$Si(OSiMe$_2$)$_f$(OSiMeG)$_b$OSiMe$_2$G, in which formula $b = 0$, then $f$ is 0–7; when $b = 1$, then $f$ is 0–7; when $b = 2$, then $f$ is 0–5; when $b = 3$, then $f$ is 0–4 and when $b = 4$, $f$ is 0–2;

(3) has the general formula

R$_a$Si{(OSiMe$_2$)$_g$(OSiMeG)$_c$OSiMe$_3$}$_{4-a}$, in which formula when $a = 0$, $g = 0$, then $c = 1$; when $a = 1$, $g = 0$, then $c = 1$; when $a = 2$, $g = 0$, then $c = 1$ or 2; when $a = 3$, $g = 0$, then $c = 1$–5; when $a = 1$, $g = 1$, then $c = 1$; when $a = 2$, $c = 1$, then $g = 1$ or 2, (4) has the general formula

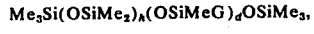
Me$_3$Si(OSiMe$_2$)$_h$(OSiMeG)$_d$OSiMe$_3$, in which formula $h$ has an average value of 0–7, $d$ has an average value of 1–5 and when $h = 0$, $d = 1$–5; when $h = 1$ or 2, then $d$ is 1–4; when $h = 3$ or 4, then $d$ is 1–3; when $h$ is 5, then $d$ is 1–2; and when $h$ is 6 or 7, then $d = 1$,

[II] thereafter allowing the mixture to foam, and

[III] curing the foamed composition.

The usual method of this invention is to combine ingredients (A), (C), (D), and (E) in any suitable container and homogenize them using any suitable means such as a commercial mixer or the like. The component (B) is then added, the mixture again homogenized and the foam allowed to rise in the container. The foam can then be cured at room temperature (cold cured) or at elevated temperatures (usually 107° C) and then removed from the container for use later. In another method, the components can be metered and mixed automatically so that the separate step of adding component (B) can be eliminated. Both of these methods are generally known in the art with the exception of the use of component (E) of the present invention. The above modes of mixing are not the only methods by which the foaming composition can be prepared. For instance, it is well within the scope of the instant invention to mix the ingredients in any order in which it is desirable. The only exception is that component (B) cannot be mixed with any polyol or similarly reactive component until the foaming is to begin.

The polyether polyols employed in this invention as component I(A) can be any polyether triol containing at least 40 mole percent of primary hydroxyl groups and having a molecular weight from about 2,000 to about 8,000 grams/mole. Preferably, said polyether polyols contain about 60–90 mole percent of primary hydroxyl groups and have a molecular weight from about 4,000 to 7,000 grams/mole.

The preferred polyether polyols of this invention are polyether triols obtained by chemical addition of alkylene oxides to trihydroxyl organic containing materials such as glycerol, 1,2,6-hexanetriol, 1,1,1-trimethylolethane, 1,1,1-trimethylolpropane, 3-(2-hydroxyethoxy)-1,2 propanediol, 3,-(2-hydroxypropoxy)-1,2 propanediol and the like, as well as mixtures thereof.

Alternatively, the polyether polyols can be mixtures consisting essentially of the above polyether triols and other polyether polyols having an average of at least two hydroxyl radicals per molecule, said triols constituting at least 40, preferably 50 or more weight percent of the total polyol content of the mixture. Such other polyether polyols having an average of at least two hydroxyl radicals per molecule are triols outside the scope of this invention, diols, tetraols, and polymer/polyols as well as mixtures thereof.

Examples of such polyether polyols containing at least two hydroxyl groups per molecule are 1,2-alkylene oxides such as ethylene oxide, epichlorohydrin, 1,2-propylene oxide, 1,2-butylene oxide and 2,3-butylene oxide, oxacyclobutane and substituted oxacyclobutanes and tetrafuran.

They may be linear polyether glycols as are prepared, for example, by the polymerization of an alkylene oxide in the presence of a basic catalyst, such as potassium hydroxide, and a glycol as a primary monoamine. Alternatively there may be used branched polyether prepared, for example, by the polymerization of an alkylene oxide in the presence of a basic catalyst and a substance having more than two active hydrogen atoms per molecule, for example, ammonia and polyhydroxy compounds such as glycerol, hexanetriols, trimethylolpropane and ethane, triethanolamine, pentaerythritol, sorbitol, sucrose and phenol-formaldehyde reaction products, aminoalcohols such as monoethanolamine and diethanolamine and polyamines such as ethylene diamine, hexamethylenediamine, diethylene triamine, tolylene diamine and diaminodiphenylmethane. Branched polyethers may also be produced by copolymerizing a cyclic oxide of the type already mentioned with cyclic oxides having a functionality greater than two, for example, diepoxides, glycidols and 3-hydroxymethyloxacyclobutanes.

Another type of polyether polyol that can be mixed with the above defined polyether triols and used as starting materials are graft polymer in polyether compositions obtained by polymerizing ethylenically unsaturated monomers in a polyether as described in U.S. Pat. No. 3,383,351. Suitable monomers for producing such compositions include, for example, acrylonitrile, vinyl chloride, styrene, butadiene, vinylidene chloride, and the like. The most preferred is acrylonitrile at this time. Suitable polyethers for producing such compositions include, for example, those polyethers described above. The graft polymer in polyether compositions can contain from about 1 to about 70 weight percent, preferably about 5–50 weight percent and most preferably about 10 to 40 weight percent of the monomer polymerized in the polyether. Such compositions are conveniently prepared by polymerizing the monomers in the selected polyether at a temperature of 40° to 150° C in the presence of a free radical polymerization catalyst, such as peroxides, persulfates, percarbonates, perborate and azo compounds. The resulting compositions may contain some unreacted polyether, monomer and free polymer as well as the graft polymer in polyether reacted species.

The base polyethers are normally used in the amount of 100 parts by weight and the remainder of the components are based upon the base polyols.

Component I(B), organic polyisocyanates, which are suitable in this invention, include aliphatic diisocyanates such as hexamethylene diisocyanate, aromatic diisocyanates such as toluene-2,4-diisocyante, toluene-2,6-diisocyanate and the familiar 80:20 isomeric mixtures of the 2,4 and 2,6 toluene diisocyanate, diphenylmethane-4,4-diisocyanate, 3-methyldiphenylmethane-4,4'-diisocyanate, m- and p-phenylene diisocyanate. Other suitable isocyanates comprise the reaction products of an excess of the diisocyanate with polyhydric alcohols such as trimethylolpropane. Still other isocyanates are blends of the above isocyanates such as toluene diisocyanate and polyaromatic polyisocyanates and crude or residual polyisocyanates from the production of purer species of polyisocyanates.

Yet other suitable isocyanates include the reaction products of polyamines with excess isocyanates such as the reaction products of polyamines with isomer blends of 65% 2,4 and 35% 2,6 toluene diisocyanate, known as adduct isocyanates. These materials are usually liquids and are polyisocyanate functional.

The isocyanates can be employed in the invention on a stoichiometric basis, that is, one isocyanate radical for every hydroxyl radical. The usual employment, however, is to utilize the isocyanates so as to give from 10% less than stoichiometric quantities of isocyanate radical to hydroxyl radical, to 20% greater than stoichiometric quantities of isocyanate radical to hydroxyl in the system. Most preferred for this invention is 5% in excess of the isocyanate radicals over the available hydroxyl radicals.

Component I(C), a catalyst for the production of the high resilient foam includes both prior art amines and soluble organic compounds of heavy metals either singly or in various combinations. Examples of amines useful in this invention include triethylenediamine and N-ethylmorpholine and examples of organic compounds of heavy metals are dibutyltindilaurate and stannous octoate. Mixtures of catalysts may be advantageous at times. The catalysts are used in the amounts ranging from 0.01–5.5 parts based on 100 parts of the base polyol.

Component I(D), the blowing agent, is water or a low-boiling organic liquid. The blowing agent can be a mixture of water and a low-boiling organic liquid. The low-boiling organic liquid should be chemically inert towards the isocyanates and water and have a boiling point less than that of water. Preferably much lower as for instance 75° C or less.

Low-boiling organic liquids include halogenated alkanes such as monofluorotrichloromethane and methylene chloride.

The blowing agent is used in the amount of 1–10 parts per 100 parts of the base polyether. When water is the sole blowing agent it is preferred to use from 2.0–4.5 parts per 100 parts of base polyether and when halogenated alkanes are the sole blowing agent it is preferred to use from 1–10 parts per 100 parts of base polyether. Mixtures of halogenated alkanes are also useful in this invention.

The final major component I(E), is the siloxane-oxyalkylene copolymer foam stabilizer. When used in this invention, the foam stabilizer when used without dilution is utilized in the amounts ranging from 0.02–2.0 parts per 100 parts of base polyether polyol. Most preferably it is used in the range of 0.5–1.0 parts per 100 parts of polyether polyol.

The essence of the present method is the use of the novel siloxane-oxyalkylene copolymers, component (E), in the foaming system.

It is the certain siloxane-oxyalkylene copolymers, when used as foam stabilizers, that allow the cured foam to consist of fine-uniform cells. It is the certain siloxane-oxyalkylene copolymers, when used as foam stabilizers, that allow the cured foam to be clear of voids, splits and holes and to be free from slab shrinkage. It is the certain siloxane-oxyalkylene copolymers, when used as foam stabilizers, that allow the cured foam to exhibit physical properties which make it useful for molded foam applications.

Presently used polyurethane foam additives found in the art and which fall outside the scope of this invention, do not allow one skilled in the art to produce polyurethane foams with the above listed advantages. Further, the normal polyurethane foam additives do not give the processor the latitude to produce foams from the two polyurethane foam systems, heretofore mentioned, without some major change in the foam stabilizer from one system to the other.

It is to be understood that the siloxane-oxyalkylene copolymers of this invention are specific materials. It is also to be understood that whenever the symbol

is used in this specification, it can have two meanings. It can be (MeGSiO) or it can be (Me$_2$GSiO) depending on the type of basic formula of the siloxanes utilized as outlined in formulas (1) to (4) above. In addition, the siloxane portion of the siloxane-oxyalkylene copolymer must contain from 0–7 (Me$_2$SiO) units and from 1–5 (MeGSiO) when the formula is that of (4) above.

When the basic formula is (2) above, the (Me$_2$SiO) units are 0–7 and the (MeGSiO) units are 0–4 and when formula (1) is used, the (Me$_2$SiO) units are 0–7 and the (MeGSiO) units are 0.

When the basic formula is (3) above, the (Me$_2$SiO) units are 0–2 and the (MeGSiO) units are 1–5. This automatically allows a molecular weight range for the basic siloxanes of this invention to be
1. from 148 to 2340;
2. from 134 to 952;
3. from 221 to 2176 and
4. from 221 to 990.

In most cases, the preferred molecular weight range of the siloxanes is from 221 to 1000.

The siloxane portion of the siloxane-oxyalkylene copolymer is represented by the four following formulae which are siloxane precursors.
1. R$_a${(OSiMe$_2$)$_e$OSiMe$_2$Z}$_4$—a
2. ZMe$_2$Si(OSiMe$_2$)$_f$(OSiMeZ)$_b$OSiMe$_2$Z
3. R$_a$Si{(OSiMe$_2$)$_g$(OSiMeZ)$_c$OSiMe$_3$}$_4$—a
4. Me$_3$Si(OSiMe$_2$)$_h$(OSiMeZ)$_d$OSiMe$_3$ R, e, a, f, b, g, c, h, d all have the meanings defined above and Z represents the appropriate reactive group including

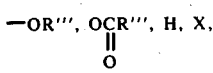

where X is chlorine, bromine or fluorine;

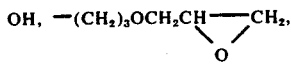

alkylhalide such as —$(CH_2)_3Cl$, alkyl hydroxide such as —$CH_2CH_2OH$ and alkyl mercaptan such as —$(CH_2)_3SH$.

Any of the siloxanes or mixtures of the siloxanes containing the same reactive group can be utilized, which give rise to a copolymer when reacted with the appropriate glycol.

The siloxanes can be prepared in a number of ways but the preferred method is to hydrolyze the appropriate silanes as for instance in (1) above, a mixture of silanes such as $R_aSiX_4$—a with dimethyldichlorosilane, dimethylmonochlorosilane and thereafter equilibrating the cohydrolyzate with an acid catalyst such as $H_2SO_4$. (2) is prepared by cohydrolyzing the silanes in proportion of $f$ moles of dimethyldichlorosilane, two mols of dimethylmonochlorosilane, and $b$ mols of methyldichlorosilane. Once again the hydrolyzate is $H_2SO_4$ equilibrated. (3) is prepared by cohydrolyzing one mol of silane of the formula $R_aSiX_4$—a with $g$ mols of dimethyldichlorosilane, $c$ mols of methyldichlorosilane and at least 4—a mols of trimethylchlorosilane and thereafter equilibrating with $H_2SO_4$. (4) is prepared by cohydrolyzing the silanes in the proportion of $h$ mols of dimethyldichlorosilane, 2 mols of trimethylmonochlorosilane and $d$ mols of methyldichlorosilane. The cohydrolyzate is equilibrated with $H_2SO_4$. It is to be understood that if the resulting cohydrolyzates have molecular weights in excess of those within the scope of this invention, the cohydrolyzates can be distilled to give the specific compounds or average structures anticipated by the claims of this invention. In each case above, R and X are the same as defined above.

Another method of preparing the siloxanes is to equilibrate siloxanes that have already been hydrolyzed. Such a method for instance would involve the equilibration at temperatures (usually in excess of 50° C), a mixture of units of ($Me_2SiO$) in the form of octamethylcyclotetrasiloxane, $b$ units of (MeZSiO) in the form of $(MeZSiO)_4$ and 1 unit of $(ZMe_2Si)_2O$ (if applicable) in the presence of an equilibrating catalyst. Such equilibrating catalysts are known in the art and consist of acid clays, acid treated melamine type resins and fluorinated alkanes with sulfonic acid groups. For those unfamiliar with such preparations, they can be found in detail in U.S. Pat. No. 3,402,192.

Because of the desirable low molecular weight of the siloxanes in this invention, it is within the scope of the invention to use siloxanes which have been prepared by re-equilibration from higher molecular weight siloxanes of the same general formulae as set out above.

The glycol portion of the siloxane-oxyalkylene copolymer must be predominantly polypropylene. It is to be understood that the glycol portion must contain less than 35 weight percent of oxyethylene or oxybutylene if they are used at all. The preferred glycol is 100 percent propylene glycol. The molecular weight of the glycol portion is 103–500 grams/mole. The preferred range is 150–350 grams/mole.

The glycols useful in the siloxane-oxyalkylene copolymer can be copolymers of propylene oxide and oxides selected from a group consisting of ethylene and butylene oxides wherein the amount of ethylene or butylene radicals is less than 35 weight percent of the total alkylene oxide in the copolymer. When siloxane-oxyalkylene copolymers are desired that contain the —Si—D— linking group, the polyalkylene glycol should contain a monoalkenyl ether endblock. The monoalkenyl ether endblocked polyalkylene glycols can be copolymers of propylene oxide and ethylene oxide or copolymers of propylene oxide and butylene oxide or can be copolymers of all three oxides provided the total ethylene and butylene oxides, either singly or combined, do not exceed 35 weight percent of the total alkylene oxide of the polyalkyleneoxide glycol. In addition, the ends of the polyglycol chain not attached to the siloxane moiety have a group A wherein A is defined above.

These glycol copolymers can be linear or branched and the molecular weight of the glycols is 103–500. The preferred range is 150–350.

One method of preparing the glycol copolymers is to dissolve sodium metal in the appropriate alcohol, i.e. allyl alcohol or ethanol, in a mole ratio of one to one and reacting the resulting product with the appropriate alkylene oxides at elevated temperatures and under pressure. The resulting product, after purification by removal of low boilers, is then capped with the appropriate group A.

The siloxane-oxyalkylene copolymer is then prepared by reacting the appropriate siloxane precursor and the appropriate glycol at elevated temperatures.

The siloxane-oxyalkylene copolymer is prepared by reacting a monoalkylene ether, preferably the allyl ether, of the desired polyalkylene glycol with a siloxane containing SiH group. When siloxane-oxyalkylene copolymers are used that contain the Si—O—C bonded copolymer, i.e. where the linking radical is —O—D, the preferred method of preparing the siloxane-oxyalkylene copolymer is by reacting the corresponding alkoxy functional siloxane with the appropriate glycols, i.e.

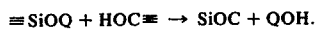

Q in this instance is a hydrocarbon radical free of aliphatic unsaturation and containing 1–10 carbon atoms.

When the siloxane-oxyalkylene copolymer contains a sulfur atom, the preferred method is to react a siloxane, which contains the mercaptan group, with a monoalkylene ether, preferably the allyl ether of the desired polyalkylene glycol using a free radical type of catalyst such as ultraviolet light or azobisisobutyrolnitrile.

The first of these preferred methods is the reaction of an allyl ether endblocked glycol with SiH containing siloxanes. The reaction is carried out by heating a mixture of the two reactants in the presence of a platinum catalyst such as chloroplatinic acid dissolved in a small amount of isopropyl alcohol, at temperatures of from 100°–200° C.

The second reaction is carried out by combining the reactants and heating in a solvent solution at reflux temperatures. The preferred solvent is xylene. The presence of a catalytic amount of concentrated hydrochloric acid facilitates the reaction.

The third type of reaction is carried out by combining the reactants, heating to the decomposition temperature of the catalyst and allowing the reaction to proceed for 1–3 hours. A sample of the material is then titrated to determine the amount of mercaptan that has reacted. The normal reactants would be a mercapto containing siloxane and an allyl ether endblocked glycol as in the first method above.

The siloxane-oxyalkylene copolymer is then used neat, or optionally with a glycol diluent, in the foam formulation. Such a diluent, for example, can be dipropylene glycol.

Because of the discovery that these certain siloxane-oxyalkylene copolymers, having the specific properties defined above, give superior high resilient foams, we have advanced the art beyond that which was known concerning high resilience polyurethane foams. Furthermore, we have overcome a prejudice in the art by our invention. In U.S. Pat. No. 3,741,917, the inventors describe their invention as a process which utilizes siloxane-oxyalkylene copolymers. They state, however, that the glycol portion of the siloxane-oxyalkylene copolymer must contain at least 35 weight percent of oxyethylene in order for suitable foams to be produced.

We have discovered that suitable foams can be produced by utilizing siloxane-oxyalkylene copolymers as foam stabilizers that contain much less than 35 weight percent of oxyethylene. Moreover, we have found that our siloxane-oxyalkylene copolymer gives more consistent foams and further, the foam stabilizer can be used in both of the recognized foam systems in use today.

It is to be understood that the composition of this invention can contain small amounts of other ingredients normally found in polyurethane foam systems such as solvents, flame retardants and low molecular weight siloxane oils.

The following examples are illustrative only and should not be construed as limiting the invention. For those unfamiliar with such preparations, they can be found in detail in U.S. Pat. No. 3,402,192.

The properties taken on the final cured foam were obtained in the following maner unless otherwise indicated.

Cell structure is a subjective test and consists of taking a vertical cut with a band saw through the standing cured foam while the foam is still in the mold, observing the cell structure and counting the number of cells per 2.54 cm. A numerical rating is placed on the cell structure ranging from 1–5 wherein 1 is fine and 5 is coarse. It can also be rated as fine, medium, or coarse wherein 1–2 is fine, 3–4 is medium and 5+ is coarse.

The air flow of a small sample cut fom the heart of the foam bun is taken on a standard breathability apparatus. A slice of foam is removed to give a flat surface from which the foam and mold are subjected to cutting at 18.4 cm. and 20.96 cm. from and parallel to the bottom of the mold. A 5.08 cm. square 2.54 cm. thick slice is cut from the center of this 2.54 cm. cross section. The air flow is taken on the apparatus at 1.27 cm. of water. The air flow is reported in liters/min. and values are taken on crushed and non-crushed foam samples and reported below as 00/00 i.e. .42/4.8.

Basal cells are large open areas in the foam ranging in size from 1 mm. in diameter (upper size limit on coarse cells) to 1½ cm. in diameter.

Basal cell rating is a test which consists of referring to the heighth at which basal cells appear in the foam bun. The measurement is made from the base of the bun. For example, a value of 5 cm. indicates that basal cells appeared in large clusters from the bottom of the bun to a heighth of 5 cm. A good foam would have no basal cells at all.

Shrinkage rating is measured on a 16 cm. wide bucket of foam by cutting the bucket, containing the cured foam, in half to give an 8 cm. wide piece.

As the bucket is cut, the faom (which is under a strain) sucks or shrinks from the center of the bucket to the sides. The number of centimeters of shrinkage is the distance the faom is pulled from the center of the bucket toward the side. A good foam would have no shrinkage at all.

In the examples and the claims, Me is employed as an abbreviation for the $CH_3-$ radical, IPA is isopropyl alcohol and all viscosities and refractive indices were measured at 25° C unless otherwise specified.

EXAMPLE 1

This example illustrates the preparation of a siloxane precursor for the polyurethane foam stabilizer.

Into a 12 liter, three-necked flask equipped with a stirrer, heating apparatus, temperature controller and a reflux condenser surmounted with a $CaCl_2$ tube, was added 1620 gms of $(Me_3Si)_2O$, 740 gms of dimethyl cyclics, 600 gms of a low molecular weight methylhydrogen fluid and an equilibration catalyst for the mixture. The mixture was heated at 65° C for 16 hours and then allowed to cool. It was treated with $NaHCO_3$ to neutralize the catalyst and then it was vacuum filtered. The resulting fluid was clear and colorless. The analytical data showed there was present 0.336% of SiH which corresponds to a molecular weight of 297.5. Theoretical was 0.338% and 296. The viscosity was 129 cs at 25° C, refractive index = 1.3848 and the specific gravity was 0.848. The formula corresponds roughly to the structure

EXAMPLE 2

The preparation of a siloxane-oxyalkylene copolymer useful as a foam stabilizer in this invention.

Into a 1 liter, 3-necked glass flask equipped with a thermometer, air motor, heating apparatus and a reflux condenser surmounted by a $CaCl_2$ tube, was placed 200 gms of the siloxane from Example 1, 280 gms of $MeO(C_3H_6O)_3H$ and 50 gms of dry xylene. The mixture was heated to 100° C and 3 ml of $H_2PtCl_6.H_2O$ in solvent (30 ppm Pt was added). The reaction was refluxed for 6 hrs at 152° C and a test was run for residual SiH which indicated a small amount was present. A small amount of stannous octoate was added to remove the residual SiH and the mixture was heated for an additional hour. The fluid was stripped to remove low boiling materials. The material had the general formula

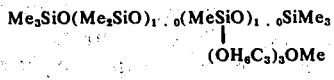

EXAMPLE 3

Evaluation of Example 2 material in a foam system utilizing a commercial foam stabilizer as a comparison.

This is a polymer in polyol system preparation of a premix:

| | | | | |
|---|---|---|---|---|
| a) | Pluracol 581[1] | 40.0 | pts | 4080.0 gms |
| b) | Dow CP4701[2] | 60.0 | pts | 6120.0 gms |
| c) | water | 2.6 | pts | 265.2 gms |
| d) | triethylene-diamine | 0.04 | pts | 4.0 gms |
| e) | Houdry X-Dm[3] | 0.80 | pts | 81.6 gms |

[1]A grafted polyglycol having a hydroxyl number of 26 mg KOH/gm and a viscosity of 2800 cps at 77° F.
[2]Polypropylene glycol triol of 4700 molecular weight and having 50% Ethylene oxide end blocking.
[3]Isocyanate containing 80/20 toluene diisocyanate and polymeric isocyanates.

This mixture was mixed for 4 hours to homogenize. To 103.44 gms of the above premix, the following was added

| | | | |
|---|---|---|---|
| f) | 10% in Dioctylphthalate of stannous octoate | .03 | pts |
| g) | WUC-3051-T[4] (isocyanate) | 34.2 | pts |

[4]A 80/20 mixture of 2,4 and 2,6 isomers of toluene diisocyanate and having a viscosity at 77° F of 15 cps. (Mfg. by BASF, Wyandotte, Mich.).

Larger quantities of the above materials were joined to have enough material to run on a foam machine, i.e. 517 gms of premix and 1.5 gms of f), and 171 gms of g).

Running the machine at 1200 R.P.M., mix time 20 seconds for the premix and 5 seconds for final mix.

Results

| Surfactant | Approx. Conc | Type of A group | Structure |
|---|---|---|---|
| commercial* | 0.1 pts | MeO | Si—C |
| Example 2 | 0.5 pts | MeO | Si—O—C |
| Example 2 | 0.1 pts | MeO | Si—O—C |

| Cells | Air Flow | Shrink |
|---|---|---|
| medium | 11.89/135.9 | none |
| fine | — | severe |
| medium | 11.33/127.4 | none |

EXAMPLE 4

This example illustrates the preparation of

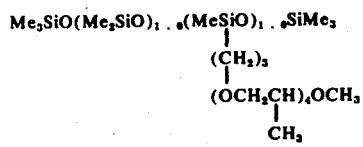

to a glass three-necked, round bottomed flask equipped with the equipment as found in Example 2, was added 296 grams of the siloxane of Example 1. To this was added 286 grams of

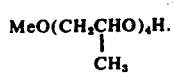

The mixture was heated to 110° C and catalyzed with 0.3 cc of chloroplatinic acid in isopropyl alcohol. The pot exothermed to 148° C and when it cooled to 120° C, it was heated for 4 hours. The product when cooled was clear and dark amber in color with a slight platinum precipitate. % SiH was found to be 0.011% or a residual amount. This product was diluted with CP-4701 to give approximately 12.5% of the surfactant in the glycol. When evaluated as a foam stabilizer, the following properties were found. Using the stabilizer at 1.0 pts per hundred gave a foam rise of 13.55 cm., cells with a rating of 2. (1 = fine, 5 = coarse), air flow (ft³/min). = 0.7/5.6 and there were no voids or splits. A commercial material gave the following properties at 1.0 pph. Rise = 5¼, cells = 1.5, air flow (liters/min.) = 21.5/169.9, no voids and no splits. It is therefore observed that the material of the present invention gives equivalent results. The system used in evaluation was that as shown in Example 3 above.

EXAMPLE 5

This example illustrates the preparation of a siloxane. To a 3-liter, 3-necked round bottomed glass flask there was added 1620 gms of $(Me_3Si)_2O$, 2220 gms of dimethyl cyclics, 600 gms of a trimethylsiloxy-endblocked methylhydrogen fluid having approximately 1.6% SiH and 4.0 gms of a sulfonic acid catalyst.

This material was heated for 7–8 hours at 65° C. The material was cooled and enough $NaHCO_3$ was added to neutralize the catalyst. The material was filtered to give a clear, colorless product. Analysis gave 0.222% SiH, Calculated was 0.225, Viscosity was 2.43 cs at 25° C. Refractive Index was 1.3903 and Specific Gravity was 0.889.

EXAMPLE 6

This example represents the preparation of an Si—C bonded surfactant using the siloxane of Example 5.

In a 1-liter, 3-necked flask was placed 400 gms of the siloxane from Example 5, 257 gms of $CH_2=CHCH_2-$

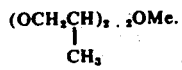

The mixture was heated to 110° C and 0.3 cc platinum catalyst solution was added (3 ppm pt). The mixture exothermed to 147° C and was heated at 140° C for 1 hour, then 120° C for 3 hours. The product was filtered and gave a light yellow, clear solution. The residual SiH was 0.012%.

The surfactant was diluted to 2.5 weight percent in CP-4701 polyglycol and evaluated in a foam system as follows.

A premix was prepared as a polymer in polyol system.

| | Ingredient | Amount Gms | Parts |
|---|---|---|---|
| (a) | $\{(CH_3)_2NCH_2CH_2\}_2O$ | 2.4 | 0.8 |
| (b) | NEM (n-Ethyl morpholine) | 24.0 | 0.8 |
| (c) | Triethylenediamine | 2.4 | 0.8 |
| (d) | Distilled water | 84.0 | 2.8 |
| (e) | Niax polyol 11-34[1] | 1800.0 | 60.0 |
| (f) | Niax polyol 34-28[1] | 1200.0 | 40.0 |

[1]light colored, low viscosity polyols produced by in-situ polymerization of a vinyl monomer in the presence of conventional polyols. 11-34 has a viscosity of 1050 cs at 20° C and a hydroxyl number of 32.5 to 35.5 mg. KOH/gm. Niax polyol 34-28 has a viscosity of 2550 cps at 25° C by a Brookfield viscometer.

This material was mixed on a roller for four hours to assure complete dispersion of the ingredients.

To the premix was added the following for every 103.76 gms of premix:
a. surfactant
b. 0.03 gm dibutyltindilaurate, mixed thoroughly and added
c. 34.2 gms of isocyanate blend composed of 80 parts of 80/20 toluene diisocyanate and 20 parts of polymethylene polyphenylisocyanate.

Carried out the additions in the following manner:

1. Added the surfactant and the tin catalyst to the premix;
2. Mixed at 750 r.p.m. for 20 seconds using a commercial mixer;
3. Added the isocyanate
4. Mixed at 1250 r.p.m. for 4 seconds;
5. Poured into a container (mold) and allowed to rise;
6. After full rise, postcured for 15 minutes at 107° C, if desired;
7. Cut foam sample and allow to cool to measure shrink tendency and air flow.

Using the above method, the following results were obtained using the material from the above example as the foam stabilizer.

At 1.0 pph surfactant: rise = 5½; cells = 1.5; air flow = 15.86/172.8; NO splits or voids; NO shrinkage.

EXAMPLE 7

Three surfactants within the scope of this invention and having the following formulas, were tested in the polymer in polyol system for effectiveness.

(1) $Me_3SiO(Me_2SiO)_3(MeSiO)_2SiMe_3$
            $\quad\quad\quad\quad\quad\quad\quad\quad |$
            $\quad\quad\quad\quad\quad\quad\quad\quad G$ (2) $Me_3SiO(Me_2SiO)_3(MeSiO)_1SiMe_3$
            $\quad\quad\quad\quad\quad\quad\quad\quad |$
            $\quad\quad\quad\quad\quad\quad\quad\quad G$ (3) $Me_3SiO(Me_2SiO)_1(MeSiO)_1SiMe_3$
            $\quad\quad\quad\quad\quad\quad\quad\quad |$
            $\quad\quad\quad\quad\quad\quad\quad\quad G$ All surfactants were diluted to 7.5 weight % in CP-4701.

In all cases, G was $-(CH_2)_3(OCH_2CH)_{2\ldots 2}OMe$.
$\quad\quad\quad\quad\quad\quad |$
$\quad\quad\quad\quad\quad\quad CH_3$ The following formulation for the foam was used.

| | | | |
|---|---|---|---|
| (a) | 60.0 | parts | CP-4701 (primary hydroxyl-Dow)[1] |
| (b) | 40.0 | parts | Pluracol 581 (Wyandotte Chem.)[1] |
| (c) | .08 | parts | $(CH_3)_2NCH_2CH_2OCH_2CH_2N(CH_3)_2$ |
| (d) | .8 | parts | N-ethyl morpholine |
| (e) | .08 | parts | Triethylenediamine |
| (f) | 2.8 | parts | Water |

[1]See example 3.

To the premix was added surfactant and

| | | | |
|---|---|---|---|
| (g) | .03 | parts | Dibutyltindilaurate |
| (h) | 34.2 | parts | Isocyanate blend as in the previous example |

Procedure:
1. Mix in (g) and the surfactant at 750 r.p.m. for 20 seconds;
2. Add isocyanate and mix at 1250 r.p.m. for 4 seconds;
3. Pour and allow 3 minutes before postcuring for 15 minutes at 107° C;
4. Cool and cut.

The Results

| Surfactant | Commercial surf. | No. 1 | No. 2 | No. 3 |
|---|---|---|---|---|
| pph surfactant | 1.0 | 1.0 | 1.0 | 1.0 |

The Results-continued

| Surfactant | Commercial surf. | No. 1 | No. 2 | No. 3 |
|---|---|---|---|---|
| Foam rise | 12.38 cm. | 14.29 cm. | 13.97 cm. | 12.7 cm. |
| Cell size | 1.5 | 1.0 | 1.5 | 2.0 |
| Shrinkage | None | Slight | None | None |
| Voids | None | None | None | Slight |
| Air flow lit./min at 1.27 cm. $H_2O$ | | | | |
| Noncrushed/ | 10.2/ | 3.96/ | 10.2/ | 21.5/ |
| Crushed | 104.8 | 73.6 | 102 | 215 |

EXAMPLE 8

The three surfactants of the above example were evaluated in a hetro polyol system.

The formulation for the foam was:

Premix

| | | | |
|---|---|---|---|
| (a) | 96.0 | parts | CP 4701[1] |
| (b) | .08 | parts | $(CH_3)_2NCH_2CH_2OCH_2CH_2N(CH_3)_2$ |
| (c) | .8 | parts | N-ethyl morpholine |
| (d) | .08 | parts | Triethylenediamine |
| (e) | 2.8 | parts | Water |
| (f) | 4.0 | parts | Pluracol polyglycol 355[2] (453 hydroxy No.) |
| | | | To the premix add surfactant and |
| (g) | .03 | parts | Dibutyltindilaurate |
| (h) | 35.0 | parts | Isocyanate blend from Example 6. |

[1]See Example 3.
[2]Polyglycol obtainable from Wyandotte Chemical, Wyandotte, Michigan.

Procedure: Essentially the same as Example 7.

The Results

| Surfactant | No. 1 | No. 2 | No. 3 |
|---|---|---|---|
| pph surfactant | 1.0 | 1.0 | 1.0 |
| cell size | 1.0 | 1.0 | 1.5 |
| shrinkage | severe | slight | none |
| air flow- crushed | — | 56.64 | 90.6 |
| voids | none | none | none |

EXAMPLE 9

A comparison example was run against a commercial surfactant using an adduct isocyanate system.

The commercial surfactant was $MeSi(OSiMe_2)_{75}(OSiMe)_7OSiMe_3$
$\quad\quad\quad\quad\quad\quad\quad\quad\quad\quad |$
$\quad\quad\quad\quad\quad\quad\quad\quad\quad (CH_2)_3 \quad\quad\quad\quad O$
$\quad\quad\quad\quad\quad\quad\quad\quad\quad\quad | \quad\quad\quad\quad\quad\quad ||$
$\quad\quad\quad\quad\quad\quad\quad O(CH_2CH_2O)_{24}(CH_2CHO)_{24}CCH_3$.
$\quad\quad\quad\quad\quad\quad\quad\quad\quad\quad\quad\quad\quad\quad |$
$\quad\quad\quad\quad\quad\quad\quad\quad\quad\quad\quad\quad\quad\quad CH_3$ The following formulation was used:

| | | |
|---|---|---|
| 100.0 | pts. | Mobay Multranol 3900 |
| 2.5 | pts. | $H_2O$ |
| 0.175 | pts. | $(CH_3)_2NCH_2CH_2OCH_2CH_2N(CH_3)_2$ |
| 0.30 | pts. | Dabco 33LV |
| 0.015 | pts. | Dibutyltindilaurate |
| 37.0 | pts. | HLG 3897 adduct isocyanate* |

*reaction product of polyamine and isomer blend of 65% 2,4 and 35% 2,6 toluene diisocyanate. Straw-colored liquid. 25–30 cps at 25° C, average functionality of 2.5, amine equivalent of about 106, manufactured by E.I. duPont de Nemours and Co., Wilmington, Delaware.

A premix was prepared of the Multron 3900, H₂O, (CH₃)₂NCH₂CH₂OCH₂CH₂N(CH₃)₂, the surfactant as shown below, dibutyltindilaurate.

The premix was mixed for 15 seconds at 1250 r.p.m.

The adduct isocyanate was added and the whole was mixed 4.5 seconds at 1750 r.p.m.

The mix was poured into a ½ gallon paper pail and allowed to rise. The resulting foam was then heated in an oven at 225° F/10 min.

The Results

| Commercial surfactant concentration (parts) | Foam Quality | Basal cell rating in cm. | Shrinkage rating in cm. |
|---|---|---|---|
| 0 | Large Basal cells | 8 | 0 |
| .01 | " | 3 | 0 |
| .05 | Large Basal cells/ Foam Shrinkage | 1.0 | 2.0 |
| .10 | Foam Shrinkage | 0.5 | 4.0 |
| .50 | " | 0 | 6.0 |
| 1.0 | " | 0 | 6.5 |
| 1.5 | " | 0 | 6.5 |
| 1.0 of Example 2 surfactant | Excellent Quality No shrink/No Basal cells | 0 | 0 |

Mobay Mutranol 3900 has an OH No. of 35 ± 2; viscosity at 25° C. of 840 ± 40 cps.

Dabco 33LV is 33.3% solids triethylene diamine in dipropylene glycol.

That which is claimed is:

1. A method of preparing a one-shot polyether based, high resilient polyurethane foam which method includes the steps of
   I. preparing a homogeneous mixture consisting essentially of
   A. 100 parts by weight of a base polyether polyol selected from a group consisting of
      i. a polyether triol containing at least 40 mole percent primary hydroxyl groups and having a molecular weight in the range of 2,000 to 8,000 grams per mole, and
      ii. a mixture of (i) and an additional polyether polyol having an average of at least two hydroxyl groups, wherein said polyether polyol is present in the mixture (ii) to at least 40 weight percent of the total polyether polyol content of (ii),
   B. a sufficient amount of organic polyisocyanate to give from 90 to 120 percent, on a stoichiometric basis, of isocyanate radicals for each hydroxyl radical in the composition,
   C. a catalytic amount of a catalyst for the production of the high resilient polyurethane foam,
   D. 1 to 10 parts by weight of a blowing agent,
   E. a foam stabilizing amount of a copolymer of the general formula Me₃Si(OSiMe₂)ₕ(OSiMeG)₄OSiMe₃, wherein $h$ has an average value of about 3, $d$ has an average value of about 1, and G is essentially

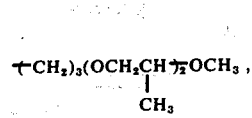

II. thereafter allowing the mixture to foam, and
   III. curing the foamed composition.

2. A method of preparing a one-shot polyether based, high resilient polyurethane foam which method includes the steps of
   I. preparing a homogeneous mixture consisting essentially of
   A. 100 parts by weight of a base polyether polyol selected from a group consisting of
      i. a polyether triol containing at least 40 mole percent primary hydroxyl groups and having a molecular weight in the range of 2,000 to 8,000 grams per mole, and
      ii. a mixture of (i) and an additional polyether polyol having an average of at least two hydroxyl groups, wherein said polyether polyol is present in the mixture (ii) to at least 40 weight percent of the total polyether polyol content of (ii),
   B. a sufficient amount of organic polyisocyanate to give from 90 to 120 percent, on a stoichiometric basis, of isocyanate radicals for each hydroxyl radical in the composition,
   C. a catalytic amount of a catalyst for the production of the high resilient polyurethane foam,
   D. 1 to 10 parts by weight of a blowing agent,
   E. a foam stabilizing amount of a copolymer of the general formula Me₃Si(OSiMe₂)ₕ(OSiMeG)₄OSiMe₃, wherein $h$ has an average value of about 1, $d$ has an average value of about 1, and G is essentially

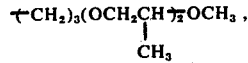

II. thereafter allowing the mixture to foam, and
   III. curing the foamed composition.

3. A method of preparing a one-shot polyether based, high resilient polyurethane foam which method includes the steps of
   I. preparing a homogeneous mixture consisting essentially of
   A. 100 parts by weight of a base polyether polyol selected from a group consisting of
      i. a polyether triol containing at least 40 mole percent primary hydroxyl groups and having a molecular weight in the range of 2,000 to 8,000 grams per mole, and
      ii. a mixture of (i) and an additional polyether polyol having an average of at least two hydroxyl groups wherein said polyether polyol is present in the mixture (ii) to at least 40 weight percent of the total polyether polyol content of (ii),
B. a sufficient amount of organic polyisocyanate to give from 90 to 120 percent, on a stoichiometric basis, of isocyanate radicals for each hydroxyl radical in the composition,
C. a catalytic amount of a catalyst for the production of the high resilient polyurethane foam,
D. 1 to 10 parts by weight of a blowing agent,
E. a foam stabilizng amount of a copolymer of the general formula Me₃Si(OSiMe₂)ₕ(OSiMeG)₄OSiMe₃, wherein *h* has an average value of about 3, *d* has an average value of about 2, and G is essentially

II. thereafter allowing the mixture to foam, and
III. curing the foamed composition.

4. A method of preparing a one-shot polyether based, high resilient polyurethane foam which method includes the steps of
I. preparing a homogeneous mixture consisting essentially of
A. 100 parts by weight of a base polyether polyol selected from a group consisting of
i. a polyether triol containing at least 40 mole percent primary hydroxy groups and having a molecular weight in the range of 2,000 to 8,000 grams per mole, and
ii. a mixture of (i) and an additional polyether polyol having an average of at least two hydroxyl groups, wherein said polyether polyol is present in the mixture (ii) to at least 40 weight percent of the total polyether polyol content of (ii),
B. a sufficient amount of organic polyisocyanate to give from 90 to 120 percent, on a stoichiometric basis, of isocyanate radicals for each hydroxyl radical in the composition,
C. a catalytic amount of a catalyst for the production of the high resilient polyurethane foam,
D. 1 to 10 parts by weight of a blowing agent,
E. a foam stabilizing amount of a copolymer of the general formula Me₃Si(OSiMe₂)ₕ(OSiMeG)₄OSiMe₃, wherein *h* has an average value of about 1, *d* has an average value of about 1, and G is essentially

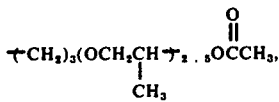

II. thereafter allowing the mixture to foam, and
III. curing the foamed composition.

5. A method of preparing a one-shot polyether based, high resilient polyurethane foam which method includes the steps of
I. preparing a homogeneous mixture consisting essentially of
A. 100 parts by weight of a base polyether polyol selected from a group consisting of
i. a polyether triol containing at least 40 mole percent primary hydroxy groups and having a molecular weight in the range of 2,000 to 8,000 grams per mole, and
ii. a mixture of (i) and an additional polyether polyol having an average of at least two hydroxy groups, wherein said polyether polyol is present in the mixture (ii) to at least 40 weight percent of the total polyether polyol content of (ii),
B. a sufficient amount of organic polyisocyanate to give from 90 to 120 percent, on a stoichiometric basis, of isocyanate radicals for each hydroxyl radical in the composition,
C. a catalytic amount of a catalyst for the production of the high resilient polyurethane foam,
D. 1 to 10 parts by weight of a blowing agent,
E. a foam stabilizing amount of a copolymer of the general formula Me₃Si(OSiMe₂)ₕ(OSiMeG)₄OSiMe₃, wherein *h* has an average value of about 1, *d* has an average value of about 1, and G is essentially

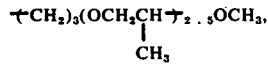

II. thereafter allowing the mixture to foam, and
III. curing the foamed composition.

6. A method of preparing a one-shot polyether based, high resilient polyurethane foam which method includes the steps of
I. preparing a homogeneous mixture consisting essentially of
A. 100 parts by weight of a base polyether polyol selected from a group consisting of
i. a polyether triol containing at least 40 mole percent primary hydroxyl groups and having a molecular weight in the range of 2,000 to 8,000 grams per mole, and
ii. a mixture of (i) and an additional polyether polyol having an average of at least two hydroxyl groups, wherein said polyether polyol is present in the mixture (ii) to at least 40 weight percent of the total polyether polyol content of (ii),
B. a sufficient amount of organic polyisocyanate to give from 90 to 120 percent, on a stoichiometric basis, of isocyanate radicals for each hydroxyl radical in the composition,
C. a catalytic amount of a catalyst for the production of the high resilient polyurethane foam,
D. 1 to 10 parts by weight of a blowing agent,
E. a foam stabilizing amount of a copolymer of the general formula Me₃Si(OSiMe₂)ₕ(OSiMeG)₄OSiMe₃, wherein *h* has an average value of about 3, *d* has an average value of about 2 and G is essentially

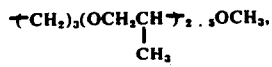

II. thereafter allowing the mixture to foam, and
III. curing the foamed composition.

7. A method of preparing a one-shot polyether based, high resilient polyurethane foam which method includes the steps of
I. preparing a homogeneous mixture consisting essentially of
  A. 100 parts by weight of a base polyether polyol selected from a group consisting of
    i. a polyether triol containing at least 40 mole percent primary hydroxyl groups and having a molecular weight in the range of 2,000 to 8,000 grams per mole, and
    ii. a mixture of (i) and an additional polyether polyol having an average of at least two hydroxyl groups, wherein said polyether polyol is present in the mixture (ii) to at least 40 weight percent of the total polyether polyol content of (ii),
  B. a sufficient amount of organic polyisocyanate to give from 90 to 120 percent, on a stoichiometric basis, of isocyanate radicals for each hydroxyl radical in the composition,
  C. a catalytic amount of a catalyst for the production of the high resilient polyurethane foam,
  D. 1 to 10 parts by weight of a blowing agent,
  E. a foam stabilizing amount of a copolymer of the general formula

wherein $h$ has an average value of about 0, $d$ has an average value of about 1, and G is essentially

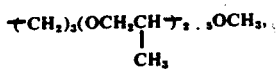

II. thereafter allowing the mixture to foam, and
III. curing the foamed composition.

* * * * *

UNITED STATES PATENT AND TRADEMARK OFFICE
CERTIFICATE OF CORRECTION

PATENT NO. : 4,031,044

DATED : June 21, 1977

INVENTOR(S) : Wallace G. Joslyn

Page 1 of 4

It is certified that error appears in the above-identified patent and that said Letters Patent are hereby corrected as shown below:

In Column 10, line 8; the line reading "As the bucket is cut, the faom (which is under a" should read "As the bucket is cut, the foam (which is under a"

In Column 10, line 40; the formula reading "$Me_3SiO(Me_2SiO)_{1.0}MeHSiO)_{1.0}SiMe_3{}_3$" should read "$Me_3SiO(Me_2SiO)_{1.0}(MeHSiO)_{1.0}SiMe_3$"

UNITED STATES PATENT AND TRADEMARK OFFICE
CERTIFICATE OF CORRECTION

PATENT NO. : 4,031,044
DATED : June 21, 1977
INVENTOR(S) : Wallace G. Joslyn

It is certified that error appears in the above-identified patent and that said Letters Patent are hereby corrected as shown below:

In Column 11, line 37; Under the chart "Results" there should be a line reading "*L-5303 manufactured by Union Carbide Corp.

In Column 12, line 52; under the Column reading "Niax polyol 11-34$^1$" should read "Niax® polyol 11-34$^1$"

In Column 12, line 53; Under the Column reading "Niax polyol 34-28$^1$" should read "Niax® polyol 34-28$^1$"

In Column 14, line 51; the formula reading "MeSi(OSiMe$_2$)$_{75}$-(OSiMe)$_m$OSiMe$_3$" should read "Me$_3$Si(OSiMe$_2$)$_{75}$(OSiMe)$_7$-OSiMe$_3$"

UNITED STATES PATENT AND TRADEMARK OFFICE
CERTIFICATE OF CORRECTION

PATENT NO. : 4,031,044

DATED : June 21, 1977

INVENTOR(S) : Wallace G. Joslyn

It is certified that error appears in the above-identified patent and that said Letters Patent are hereby corrected as shown below:

In Column 14, line 62; Under the Column reading "Dabco 33LV" should read "Dabco® 33LV"

In Column 15, line 27; the line reading "Dabco 33LV is 33.3% solids triethylene diamine in" should read "Dabco® 33LV is 33.3% solids triethylene diamine in"

In Column 17, line 67; the line reading "igh resilient polyurethane foam which method in-" should read "high resilient polyurethane foam which method in-"

In Column 17, line 68; the line reading "ludes the steps of" should read "cludes the steps of"

UNITED STATES PATENT AND TRADEMARK OFFICE
CERTIFICATE OF CORRECTION

PATENT NO. : 4,031,044
DATED : June 21, 1977
INVENTOR(S) : Wallace G. Joslyn

It is certified that error appears in the above-identified patent and that said Letters Patent are hereby corrected as shown below:

In Column 18, line 11; the line reading "droxy groups, wherein said polyether polyol is" should read "droxyl groups, wherein said polyether polyol is"

Signed and Sealed this

Nineteenth Day of January 1982

[SEAL]

Attest:

Attesting Officer

GERALD J. MOSSINGHOFF

Commissioner of Patents and Trademarks